United States Patent [19]
Weber et al.

[11] 3,895,899
[45] July 22, 1975

[54] EXTRUSION DIE

[75] Inventors: Herbert Weber, Effretikon, Switzerland; Alfred Wagner, Steisslingen, Germany

[73] Assignee: Swiss Aluminium Ltd., Chippis, Switzerland

[22] Filed: Mar. 26, 1973

[21] Appl. No.: 344,481

[30] Foreign Application Priority Data
Mar. 30, 1972 Switzerland.......................... 4784/72

[52] U.S. Cl.............. 425/378 R; 164/138; 425/461
[51] Int. Cl................................................ B29f 3/08
[58] Field of Search ............... 76/107 A; 148/6, 6.3; 164/138; 249/134; 425/461, 462, 463, 464, 465, 466, 467, 378, 376, 382.2, 379; 264/88, 89

[56] References Cited
UNITED STATES PATENTS
3,212,142  10/1965  Moritz ........................... 425/461 X
3,423,566  1/1969  Wickard ......................... 425/461 X
3,447,588  6/1969  Niskovskikh et al. .......... 164/138 X
3,461,495  8/1969  Swickard et al. ............... 425/378 X Primary Examiner—R. Spencer Annear
Assistant Examiner—Mark Rosenbaum
Attorney, Agent, or Firm—Ernest F. Marmorek

[57] ABSTRACT

An extrusion die has a working surface constituted by a portion of the die body, on which is a layer formed of diffusion products, such as nitrides or borides, of the material of the body, on which in turn is a coating consisting of a binder together with one or more metallic materials or one or more solid lubricants, or both, the die including a coolant conduit arrangement in thermal connection with the working surface.

10 Claims, 4 Drawing Figures

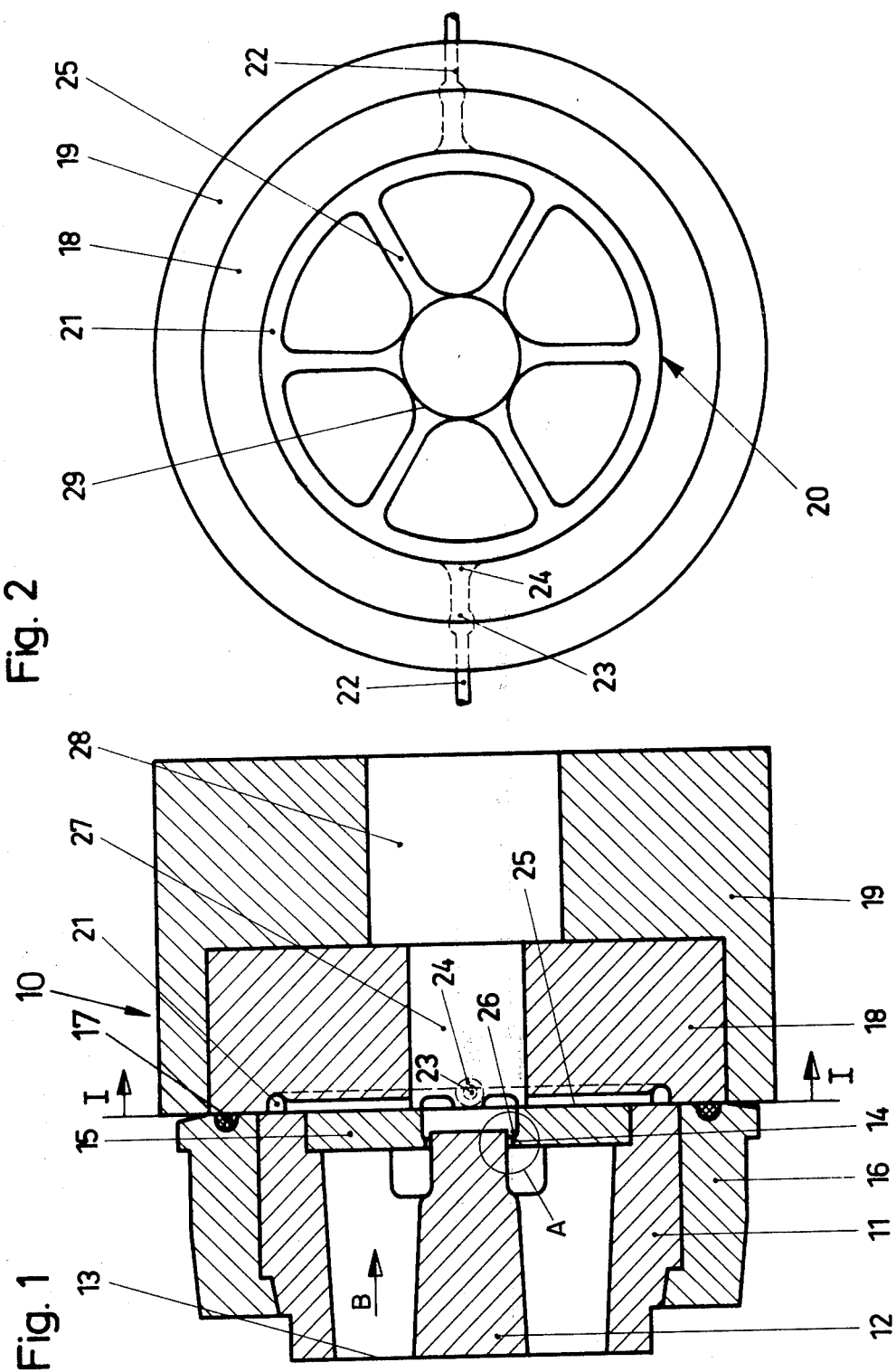

EXTRUSION DIE

This invention relates to dies for manufacture of sections by extrusion.

In the manufacture of sections consisting of metallic materials, such for example as aluminium or an aluminium alloy, extrusion speed and die life are two significant factors for economic conduct of the manufacturing process.

With the aim of economical manufacture, high extrusion speeds are to be striven for, but limits are set by internal strains in a section giving rise to transverse cracks, and by impairment of the surface quality. On exceeding an upper limiting value of speed, the strain differences from the interior of the section to the surface increase in such a way that the thermal expansion of the section surface is no longer able to take up the tensile forces resulting from the strain differences, and transverse cracks occur in the section, producing scrap material. Furthermore, with an excessively high extrusion speed applied to aluminium, the aluminium oxide layer appearing on the section surface breaks apart either totally or partially. Sections with such surface injuries are for example unsuitable as anodising quality.

It has long been recognised that there exists a direct relationship between extrusion speed and deformation heat arising during the extrusion process in the tool and the workpiece, and that an excessive deformation heat caused by extrusion speed is the origin of the mechanical and visual injuries in the product. In the state of the art there are substantially two routes indicated for reducing this excess heat which retards production.

One route is to reduce the heat content of the extrusion blank by the same amount of heat as arises as surplus in the tool or workpiece due to increased extrusion speed. This method has however the disadvantage of an increased extrusion pressure, which entirely cancels again the gain made economically by the greater extrusion speed.

As another route it is known to optimise the heat content of the extrusion blank with reference to the section to be extruded and the extrusion pressure, and to carry away from the extrusion tool the additional deformation heat deriving from an increased extrusion speed. In the dies to be employed with this method of extrusion, a coolant conduit surrounds with slight spacing the working surface of a die. The deformation heat arriving at the working surface, and to be carried away for avoidance of injury to the workpiece, is given up to a coolant, as for example water, flowing through the conduit. Water as coolant has the disadvantage that the efficiency of cooling is impaired by deposits in the coolant conduit. It is also known to permit liquid nitrogen as coolant to circulate in a closed circuit. The liquid nitrogen takes up in the die the deformation heat to be carried away, and then flows through a cooling device, which takes away again from it the heat content imparted to it, in order to thereafter again flow through the die. The economical output of this cooling method justifies its employment only in the rarest cases.

Furthermore there exists a direct relationship between the mechanical and thermal loads released in a die during a deformation process, and the life or working period of the die. The higher the loads are, the lower is the working period depressed.

For dies which are operated without cooling, specially alloyed iron materials have produced an extension of the working period. For dies operated with cooling, proportionally lower working periods are attained having regard to the increased wear of the die by the increased extrusion speed.

In consequence of further considerations for extension of the usability of uncooled or cooled dies, a start has been made to treat the dies at regular intervals by special means.

For treatment it is known to treat the dies with a nitriding process. In this, nitrogen is introduced into the material by the diffusion method, preferably only on the working surface of the die. The nitrogen forms nitrides with the die material, for formation of a layer very resistant to erosion. This treatment does not give entire satisfaction. For nitriding, significant expenditure is necessary in equipment and energy. Furthermore, with long heating of the dies, as is the case for example on heating of the dies in a furnace, the nitrogen tends to rediffuse, with destruction of the diffusion layer.

In place of metallurgical conversion, such as nitriding, it is also known to provide working surfaces of a die with a coating. Metallic materials and/or solid lubricants are applied onto the working surfaces with an inorganic binder resistant to high temperature. The mixing of these components takes place in a spray pistol, which applies the mixed components onto the surface with a velocity of about 200 m/sec. Before an application, the working surfaces are cleaned, degreased, polished and honed. The binder hardens at room temperature, while the hardening can be accelerated by warming.

Such coating has become known to skilled people as "Microsealing." Material for such coating is made by Microseal Corporation (a subsidiary of Great Lakes Corporation), of West Lafayette, Ind., U.S.A.

This kind of working surface treatment has certain advantages as compared with nitriding, in as much as the spray pistol is easily handled and only a limited energy requirement is necessary for production of the layer. However, against this improvement there is a reduced working period of the layer, with the consequence of more frequent operations than with nitriding within the total working period of a die. This defect is however again somewhat equalised, in that tools coated by this method permit somewhat higher extrusion speeds, than do nitrided ones. The basis for this lies in the properties of the metallic materials and/or solid lubricants and the good thermal conductivity of the coating. A comparison of all economically significant factors gives to this kind of treatment an advantage not to be ignored.

For extrusion without cooling, the nitriding or coating carried out at intervals has produced a notable increase of the working period for the attainable extrusion speeds. With cooled dies, however, it has now appeared that, having regard to the increased extrusion speed and undertaking otherwise similar measures as with uncooled dies, no correspondingly extended working period can be achieved but even a reduced one, because the intervals between two nitridings or coatings appear significantly shorter, even though the heat content of the cooled die corresponds to that of the uncooled one. Because of the unexplained shorter intervals, the effectively attainable total working period is lower than would normally be expected.

The invention starts from here, and the object underlying it is to provide a die suitable for a rapid extrusion process with extended intervals between two treatment operations.

An extrusion die according to the present invention has a working surface constituted by a portion of the die body, on which is a layer formed of diffusion products of the material of the body, on which in turn is a coating consisting of a binder together with one or more metallic materials or one or more solid lubricants, or both, the die including a coolant conduit arrangement in thermal connection with the working surface.

Surprisingly it is found that with a die construction of this kind, an unexpected extension of the intervals between treatments, and at the same time of the entire life of the die, results at high extrusion speeds.

The extension of the intervals between treatment lies far beyond that which is to be expected from the sum of the known working periods with a layer consisting of diffusion products of the working surface material and with a coating.

The causes for the behaviour of a die made according to the invention are not entirely clear. However, experiments have shown that the means claimed are the objectively causative prerequisites for the technical result achieved according to the invention.

Nitrides form principally in needle shape during a diffusion treatment, and the needles are firmly anchored in the basis material. Moreover a nitride layer has a certain porosity, which is desirable for adhesion of the coating. Accordingly, the layer formed of diffusion products advantageously consists of nitrides.

If a die is to be used with alloys which are extrudible with difficulty, it can be suitable that the layer consists of borides of the working surface material. The advantage of a layer consisting of borides in comparison with one of nitrides lies in its higher hardness, which ranges in the zone from Vickers hardness number 1600 to 3000, according to the way in which the layer is produced. The higher hardness imparts to it a greater resistance to erosion, so that it is suitable for alloys which are extrudible with difficulty or which act especially abrasively during an extrusion operation.

According to the shape of a section to be extruded, a layer consisting of diffusion products can be subjected locally to different loadings, e.g., compression or impact loadings, which can especially destroy layers consisting of borides, either totally or locally. Against this a remedy can be provided, by making the layer consist of borides and nitrides of the working surface material.

The diffusion treatment for formation of this "sandwich" layer suitably takes place by a simultaneous penetration of nitrogen and boron into the working surface material. Because of the different diffusion velocities of boron and nitrogen, the boride layer forms itself on top of that of nitrides, so that the nitride layer is in engagement with the working surface material. The nitride layer has a more limited hardness and at the same time greater elasticity, so that it is able to accept the mechanical loads acting on the boride layer after the manner of a buffer, while the fragility of the boride layer against impact, brought about by its hardness, is reduced.

In the selection of materials for the coating, graphite comes into consideration as a solid lubricant, which because of its lamellar formation has a slight frictional coefficient. It can also be preferred for many cases of use to employ molybdenum disulphide as solid lubricant. For extreme extrusion conditions it can advantageous to prepare the graphite additionally with one or more alkaline earth metals. These metals are suitable especially for incorporation in the graphite, with formation of a good lubricant.

As a binder for the coating there comes into consideration preferably an inorganic binder resistant to high temperature. By "resistant to high temperature" there is to be understood a resistance to temperatures up to appreciably above the maximum temperatures appearing in the die. In selection of the inorganic binder, care should be taken that it is resistant against oil and oil components, which can be present on the extrusion billet or extrusion bar from working operations preceding the extrusion, or be present in the receiver.

Tests with dies according to the present invention using conventional fluid cooling have shown pronounced working periods between treatments. However, because of the restricted heat removal ability of fluids such as water or liquid nitrogen, the extrusion speed was restricted to one for attainment of an anodising quality for the section. It was apparent that these physical coolant properties were preventing the economically most satisfactory employment of the dies.

To enable the best possible employment of the dies, derived from the working surface formation, in practical extrusion, the die advantageously has its coolant conduit arrangement consisting of a channel arranged near the working surface, one or more inlets and one or more outlets communicating with the channel, and an expansion chamber in each inlet. As coolant in this coolant conduit arrangement, there is used a material which can almost instantaneously change its state, preferably from liquid to gaseous condition, in order to be able to supply to the die a heat remover of large volume for carrying away the additional quantity of deformation heat released by an enhanced extrusion speed. Although fundamentally all gases which can be liquefied at low temperature come into consideration for this, nitrogen is preferred because it is relatively cheap and able to be handled without danger, and exhibits a significant volume increase factor on change of state. The nitrogen is supplied to the die in liquid condition, to the beginning of the inlet into the die, and changes into the gas phase in the inlet and expansion chamber, to thereafter flow through the channel to the outlet with removal of heat from the working surface. It has appeared that with this kind of cooling, in conjunction with the working surface formation according to the invention, an economy of extrusion not hitherto attainable can be brought about.

In general, extrusion speeds which ensure a satisfactory section surface of anodising quality have been below the limiting extrusion speed beyond which a reliable welding of the partial streams of material from the extrusion billet formed by a bridge becomes questionable, e.g., with hollow sections. With a die formed according to the invention and cooled in this way, the extrusion speed can be advanced substantially up to this limit without injury of the surface quality.

It is known with existing dies that in long production runs more and more dies have to be held in reserve, of which at least two should be preheated, so that a substitute is available upon a suddenly occurring die failure. Not uncommonly the die requirement amounts to five to six pieces, which amounts to an economically significant factor in the tool provision for manufacture of one section. The dies formed to the invention have shown themselves in extrusion operation to be so trouble-free that, even with longer production runs one can, without risk, reduce the provision of the dies to one standby die.

Another advantageous feature is to arrange the one or more outlets from the coolant conduit channel to extend towards a downstream end of the working surface. Normally at the downstream end of a working surface, in other words at the die mouth, atmospheric oxygen is present, which favours oxidation of the section and also favours depositing of crust-like oxides on the die mouth. The deposits break form time to time, with incorporation of the fragments in the section surface, from which arise places of failure. By carrying the expanded inert coolant direct to the die mouth, there is provided a protective gas atmosphere displacing the atmospheric oxygen, which suppresses the oxidation and the formation of crust. In this way injuries to the extrusion process, which could influence the economics, are thoroughly excluded.

Examples of dies embodying the invention are shown in the accompanying drawings. In these drawings:

FIG. 1 shows one die in longitudinal section;

FIG. 2 is a section on the line I—I in FIG. 1;

Figure 3:
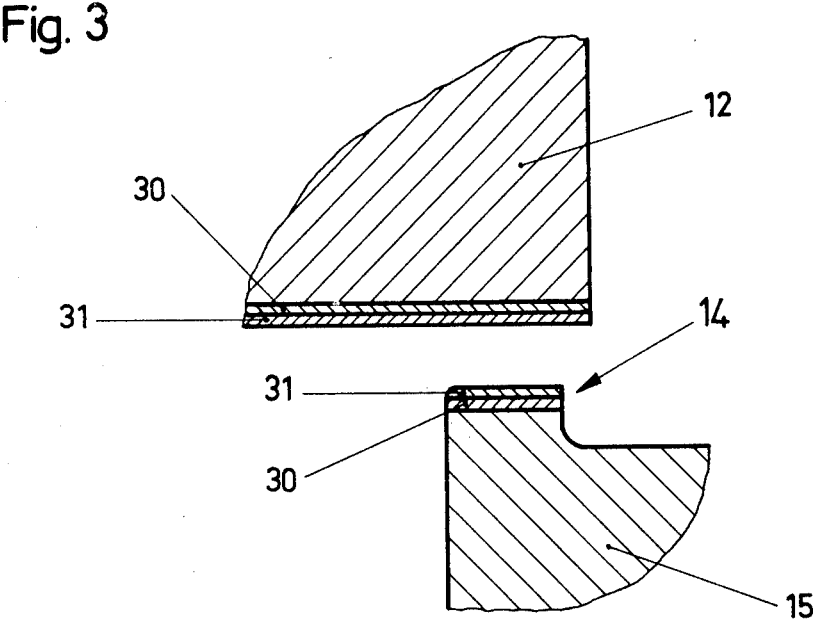
FIG. 3 is an enlarged detail at A in FIG. 1, which shows the layer and the coating.

In FIG. 1 the direction of flow of the metal is indicated by the arrow B. The tool consists of the die 11, which, for production of a hollow section, is provided with a core 12 fastened to a bridge (not shown). The flowing metal enters into the die 11 through entry openings 13 in streams divided by the bridge, and emerges out of the die 11, with union and welding of the partial streams, along a working surface 14, with formation of the desired workpiece.

In the present case the die 11 is formed in two parts, because an insert 15 is provided for formation of the outer circumference of the workpiece. The die 11 with the insert 15 is inserted into a holder 16, which is supported via a sealing ring 17 on a pressure ring 18, which in its turn is received in a pressure ring holder 19.

In the present case the coolant conduit arrangement 20 is formed by a channel 21 in thermal connection with the working surface 14. Two inlets 22, diametrically opposite to one another, feed into the channel 21. In each of the inlets there is an expansion chamber, 23, 24 respectively, to facilitate the change of state of a liquid low temperature coolant into its gas phase. For provision of a protective gas atmosphere at the die mouth 26, several outlets 25 starting from the channel 21 extend as radii to the neighbourhood of the die mouth 26.

As is clearly visible from FIGS. 1 and 2, the channel 21 is in the form of a groove in the pressure ring 18, which is covered by the die 11 when the tool is assembled. The outlets 25 are likewise in the form of grooves in the pressure ring 18, and the open sides of the outlets 25 are partially covered by the die 11 and the insert 15. The seal 17 prevents a gas leakage flow between the die holder 16 and pressure ring holder 19. Thus deformation heat, resulting at the working surface 14 and requiring to be carried away, is taken through the insert 15 and the die 11 to the coolant in the channel 21, while a part of the quantity of heat in the insert 15 is already given up to the inert gas flowing through the outlets 25. The pressure ring 18 and the pressure ring holder 19 have central openings 27, 28 which are passed through successively by the extruded section. The protective gas atmosphere forms in the openings 27 and 28 for thorough suppression of oxidation of the section surface and of crust deposition at the die mouth 26.

This way of introducing a cooling arrangement into an extrusion tool is convenient on manufacturing grounds. The channel 21 and the outlets 25 can very easily be made in the end surface of the pressure ring 18. Furthermore, if shorter routes for heat transfer form the working surface 14 of the coolant conduit arrangement 20 are desired, it is only necessary to replace the pressure ring 18 by another with a channel 21 which has a smaller radial spacing from the working surface 14.

The outlets, as shown in FIG. 2, have large radii at their outlet end 29, which exert a favourable influence on the formation of the protective gas atmosphere. Otherwise the outlets have parallel walls.

If, as an alternative, the die 11 is in one piece, i.e., formed without an insert 15, then no alterations need to be undertaken with reference to the arrangement and formation of the coolant conduit arrangement 20.

FIG. 3 shows an enlarged detail at A in FIG. 1. The core is indicated at 12 and the insert at 15, as already explained above. On the insert 15, over the area of the working surface 14, there is a layer 30 formed from diffusion products of the material of the body of the insert 15. Preferably this layer 30 consists of nitrides of the material of the insert 15, produced by the diffusion method. The thickness of the nitride layer, i.e., zone of union, can lie between 3 and 12 $\mu$m. It is however preferable for the nitride layer thickness to be around 5 $\mu$m, as a lesser thickness has less life, whereas greater thickness does not have substantially greater life.

In measurement of the nitride layer thickness, the diffusion zone, which amounts to a multiple of the zone of union, must not be taken account of.

On the layer 30 is a coating 31. This coating 31 consists in the present case of an inorganic binder with graphite contained in it. With a coating thickness of 2 $\mu$m, excellent working periods for the working surface 14 are achieved. Here also the layer thickness is measured without the anchoring area in the zone of union. In order to ensure good sliding of the extruded material along the core 12, the circumferential surface of the core can also be formed like the working surface 14.

Figure 4:
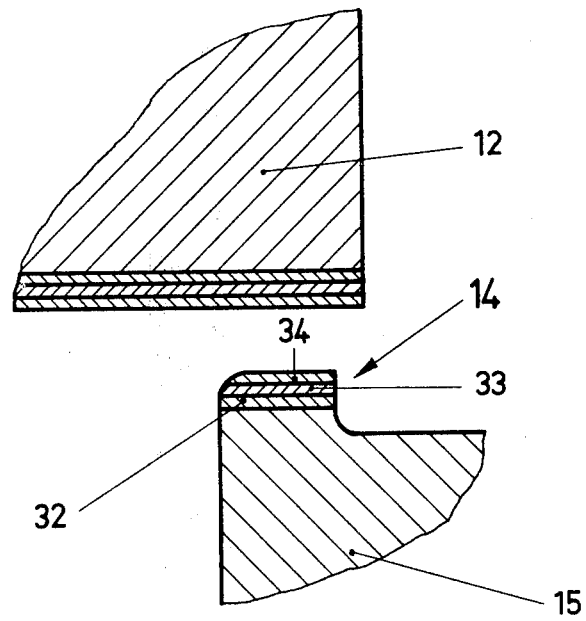
FIG. 4 is an enlarged detail similar to FIG. 3, which shows an alternative.

FIG. 4 shows a modification of the formation of the working surface, which differs from that according to FIG. 3 in that the diffusion products of the material of the insert 15 are both nitrides and borides. A layer 32 formed of nitrides is in direct engagement with the material of the insert 15, and it carries a boride layer 33 on its side facing towards the core 12. The thickness of the layer 32 formed of nitrides corresponds to that according to FIG. 3, in which the thickness of the layer 33 consisting of borides is simply that which is necessarily formed in simultaneous boriding and nitriding. The coating 34 corresponds to that described in conjunction with FIG. 3. The circumferential surface of the core 12 can also either be formed like the circumferential surface of the core according to FIG. 3 or correspond to the working surface 14 as in FIG. 4.

The following comparative Experiments illustrate the value of the invention. Experiment III embodies the invention, while Experiments I and II do not.

EXPERIMENT I

| | |
|---|---|
| 1) Extruded section | Tube<br>External diameter 40 mm<br>Internal diameter 30 mm |
| 2) Extruded material | AlMgSi 0,5 |
| 3) Die material | Hot working steel 2343<br>0.38% C;1% Si; 0.4% Mn;<br>P and S maximum 0.025%;<br>5,3% Cr; 1.0% Mo; 0.4% V<br>Remainder Fe |
| 4) Nitride layer thickness<br>   Coating layer thickness | 5 $\mu$m<br>0.0 $\mu$m |
| 5) Extrusion billet dimension | 215 mm Diameter<br>820 mm Length |
| 6) Receiver dimension | 224 mm |
| 7) Extrusion billet temperature | 470°C |
| 8) Temperature of the section emerging from the die, measured 1.5 mm after the die mouth | 520 – 540°C |
| 9) Required surface quality of the section | Roughness depth $\leq$ 8.5 $\mu$m |
| 10) Coolant | Gaseous nitrogen |
| 11) Extrusion speed | 28 – 30 m/min |
| 12) Quantity of extrusion billets put through the die between two working surface treatments | 36 pieces |

EXPERIMENT II

Corresponds in all details to those of Experiment I, with the exception of:

| | | |
|---|---|---|
| 4) Nitride layer thickness | 0.0 | $\mu$m |
|    Coating layer thickness | 2.0 | $\mu$m |
| 11) Extrusion speed | 37 | m/min |
| 12) Number of extrusion billets put through the die between two working surface treatments | 33 | pieces |

EXPERIMENT III

Corresponds in all details to those of Experiment I, with the exception of:

| | | |
|---|---|---|
| 4) Nitride layer thickness | 5 | $\mu$m |
|    Coating layer thickness | 2 | $\mu$m |
| 11) Extrusion speed | 39 | m/min |
| 12) Number of extrusion billets put through the die between two working surface treatments | 210 | pieces |

The quantity of extrusion billets put through was determined according to the required surface quality, i.e., when the depth of roughness reaches larger values than 8.5$\mu$m, then the extrusion was interrupted. It is apparent form the Experiments that, with a die having its working surface treated according to the invention, almost six times the quantity of extrusion billets can be put through between two working surface treatments.

What we claim is:

1. An extrusion die having a die body, for use in the manufacture of sections of metallic materials,
said body including a portion composed of a certain material defining a working surface region,
said body further defining a conduit for a coolant in good thermal conductive communication with said working surface region,
said working surface region comprising a layer of diffusion products of said body material and
a coating disposed on said layer,
said coating including an inorganic binder resistant to elevated temperatures and a solid lubricant.

2. The die as claimed in claim 1, wherein said conduit includes a channel defined in said body near said working surface region, at least one inlet means having an expansion chamber defined therein and communicating with said channel, and at least one outlet means communicating said channel with the exterior of said body.

3. The die as claimed in claim 2, wherein said working surface region has a downstream end towards which material entering said body move and said outlet means is disposed at the downstream end of said working surface region.

4. The die according to claim 1, in which the layer consists of nitrides of the material of the body.

5. The die according to claim 1, in which the layer consists of borides of the material of the body.

6. The die according to claim 1, in which the layer consists of borides and nitrides of the material of the body.

7. A die according to claim 1, in which the coating includes graphite as the solid lubricant.

8. The die according to claim 1, in which the coating includes molybdenum disulphide as the solid lubricant.

9. An extrusion die having a die body, for use in the manufacture of sections of metallic materials,
said body including a portion composed of a certain material defining a working surface region,
said body further defining a conduit for a coolant in good thermal conductive communication with said working surface region,
said working surface region comprising a layer of diffusion products of said body material and
a coating disposed on said layer,
said coating including an inorganic binder resistant to elevated temperatures and solid metallic substances.

10. An extrusion die having a die body, for use in the manufacture of sections of metallic materials,
said body including a portion composed of a certain material defining a working surface region,
said body further defining a conduit for a coolant in good thermal conductive communication with said working surface region,
said working surface region comprising a layer of diffusion products of said body material and
a coating disposed on said layer,
said coating including an inorganic binder resistant to elevated temperatures, metallic substances and solid lubricants.

* * * * *